(No Model.)

G. A. CHAPMAN & J. H. NEWBURY.
DEVICE FOR CUTTING SCREW THREADS.

No. 423,729. Patented Mar. 18, 1890.

Witnesses

Inventors
Jay H. Newbury and
George A. Chapman
By their Attorneys

UNITED STATES PATENT OFFICE.

GEORGE A. CHAPMAN AND JAY H. NEWBURY, OF GUILDERLAND, NEW YORK.

DEVICE FOR CUTTING SCREW-THREADS.

SPECIFICATION forming part of Letters Patent No. 423,729, dated March 18, 1890.

Application filed June 7, 1888. Serial No. 276,307. (No model.)

*To all whom it may concern:*

Be it known that we, GEORGE A. CHAPMAN and JAY H. NEWBURY, citizens of the United States, residing at Guilderland, in the county of Albany and State of New York, have invented a new and useful Improvement in the Method of Cutting Screw-Threads, of which the following is a specification.

Our invention relates to an improvement in devices for cutting the screw-threads on the inner and outer sides of bushings for coupling gas and other pipes, and in machines whereby the said process is carried into effect; and it consists in the peculiar construction and combination of devices, that will be more fully set forth hereinafter, and particularly pointed out in the claims.

Figure 1:
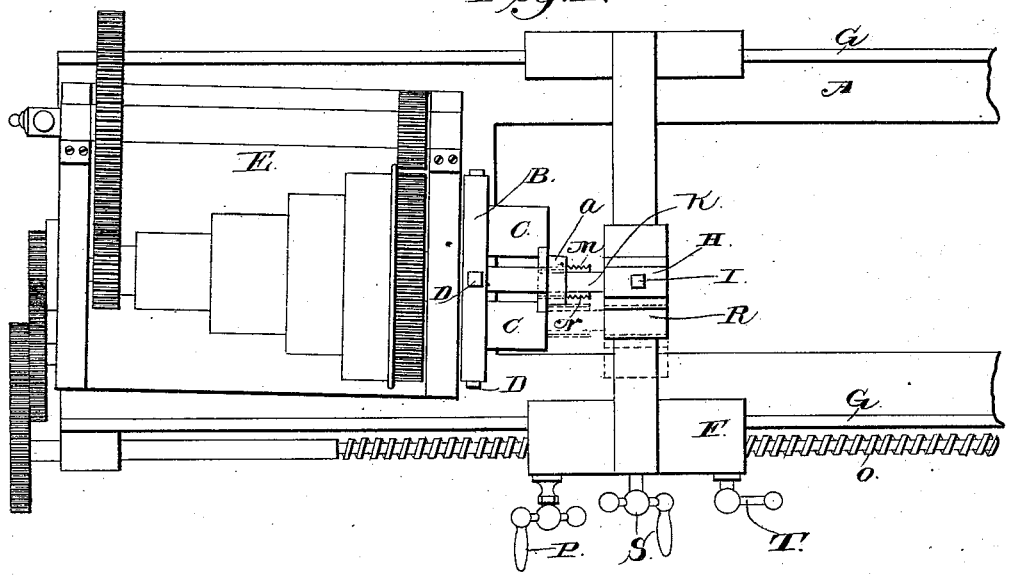
Figure 2:
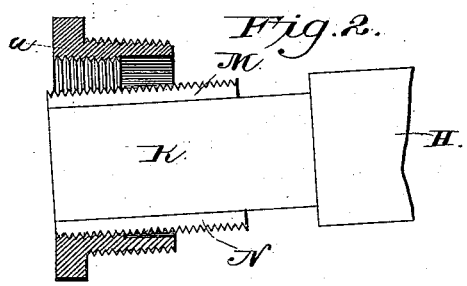
Figure 3:
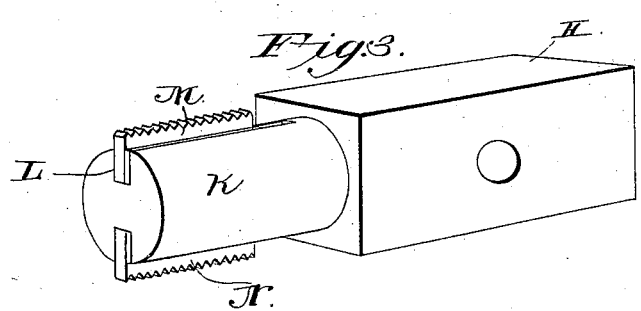

In the drawings, Figure 1 is a top plan view of a portion of an engine-lathe arranged in position for cutting the screw-threads on a bushing in accordance with our improvement. Fig. 2 is a detailed sectional view of a bushing, showing the chaser arranged in an oblique direction in the inner side of the same in position for cutting the interior threads of the bushing. Fig. 3 is a detailed perspective view of the chaser-holder and chaser.

The bushings employed for connecting gas and other pipes are provided with external and internal screw-threads, the outer and inner sides of the bushing being tapered in the same direction and arranged concentrically, so that when the bushing is coupled to the meeting end of two pipes it effects a perfectly gas-tight joint between them. Heretofore it has been the practice in making bushings of this character and of the small sizes of malleable iron to first cut the interior screw-thread by means of a tap on a lathe and then remove the tap and substitute a screw-cutting die therefor to cut the external screw-threads, both tap and die rendering the use of oil or other lubricant necessary when cutting the thread on the bushing. It has been heretofore necessary to employ malleable iron in the manufacture of bushings of the smaller sizes, for the reason that the shells or sides of the same are so thin that the bushing would be cracked and broken when subjected to the severe strain imposed when the tap is engaged in cutting the interior thread if the bushing were made of cast-iron. Bushings made in the manner hereinbefore described are necessarily expensive, first, because they are made of malleable iron; secondly, because they have to be attached to and disconnected from the lathe twice during the processes of cutting the external and internal screw-threads, and, thirdly, on account of the expense attendant on the use of the oil and the labor of removing the residuum of oil from the bushings after the latter have been completed.

The object of our invention is to provide a means whereby a bushing may be provided with both external and internal screw-threads without the necessity of removing the bushing from the lathe until after it has been completed, without the necessity of employing oil when cutting the threads, and without exerting considerable strain on the bushing during the process of its manufacture, thereby enabling us to make bushings of the smaller sizes of cast-iron without the risk of breaking or injuring the same, and consequently enabling us to furnish a finished product of maximum strength at minimum cost, and which is accurately screw-threaded, so that the inner threads are exactly concentric with the external threads.

In order to carry our process into effect, we first take a cast blank $a$—such as illustrated in Fig. 1—and secure the same to the centering-chuck B of an engine-lathe A by means of clamping-arms C, which are operated by means of the usual screws D, and project for a suitable distance—say two inches—beyond the face of the chuck, thereby holding the inner sides of the blank at that distance therefrom. The head E of the lathe, being swiveled or pivoted on its bearings in the usual manner, is turned in an oblique direction at an angle corresponding with that of the tapered sides of the bushing, and to the carriage F of the lathe, which travels on the usual guides G, is secured an arm or chaser-holder H by means of a bolt I. Said arm or chaser-holder is arranged in a horizontal plane and parallel with the guides G, and is provided at its end which is presented toward the chuck with a spindle K, the same being provided on opposite sides with recesses or longitudinal grooves L, the outer ends of which are open, as shown in Fig. 3. Into the said grooves or recesses on opposite sides of the spindle are inserted screw-cutting chasers or tools M N, which are adapted, respectively, to cut the exterior and interior screw-threads.

The carriage is operated longitudinally on the lathe by means of the usual screw O and the usual gearing having the operating-crank P.

The table R, which carries the chaser-holder, is movable transversely on the carriage by means of the usual screw, having handle S, and the carriage F may be connected to or disconnected from the screw O by means of the usual open nut, (not shown,) which is operated by the crank-handle T.

Having arranged the blank in the position before described, and illustrated in Fig. 1, the operator moves the table R on the carriage until the cutting-edge of the chaser N is in line with the inner side of the blank. The spindle of the lathe is set in motion, so as to impart rotary motion to the chuck and to the blank, and the operator, by means of the crank-handle S, moves the carriage on the bed of the lathe, so as to cause the chaser N to engage the inner side of the blank, as shown in Fig. 2, and to cut the internal screw-threads therein as the chaser passes through the said blank, as will be readily understood. The chaser, as will be seen by reference to Fig. 3, is comparatively narrow, and the combined width of the spindle K and chasers M N is less than the internal diameter of the blank, and hence the chaser N is only in contact with a comparatively small portion of the internal area of the blank while it is operating therein, thus offering but a minimum amount of friction to the rotation of the blank and cutting the screw-threads cleanly and sharply without the use of oil or other lubricant and without exerting considerable disintegrating strain on the blank. As soon as the internal screw-thread has been completed the operator, without arresting the rotation of the chuck and of the blank, moves the table of the carriage a slight distance, so as to cause the chaser N to clear or move out of contact with the internal thread of the blank, and he then opens the nut, before mentioned, which engages the screw O by means of the crank-handle p, and moves the carriage back to its initial position, when he again closes the nut on the screw O and directs the chaser M to the outer side of the blank by moving the table R a suitable distance laterally on the carriage, thereby causing the chaser M to cut the exterior screw-thread. Inasmuch as the relative position of the blank and of the chaser remains unchanged during the operation of cutting both the external and internal screw-threads, it follows that said threads must necessarily be exactly concentric with each other, and hence no irregularity can occur in this particular, thereby causing the bushing manufactured by our improved process to be superior in this respect to the bushings made in the usual way. As soon as the external thread is completed and the chaser moved from the bushing the rotation of the spindle is arrested by the operator, the finished bushing is removed from the chuck and another substituted instead, and the process before described is repeated. Bushings thus manufactured can be turned out with great rapidity—at more than twice the rate with which the ordinary bushing can be made—and at a correspondingly reduced cost.

Having thus described our invention, we claim—

The combination, with the devices for holding and rotating the bushing, of the chaser-holder having the chasers M N on opposite sides and of less diameter than the internal diameter of the bushing, and means, substantially as set forth, to secure the chaser-holder and apply its chasers alternately to the inner and outer sides of the bushing, whereby the latter will be provided with concentric external and internal screw-threads, substantially as described.

In testimony that we claim the foregoing as our own we have hereto affixed our signatures in presence of two witnesses.

GEORGE A. CHAPMAN.
JAY H. NEWBURY.

Witnesses:
THOMAS H. GREER,
J. H. CONNICK.